United States Patent [19]
Abe et al.

[11] Patent Number: 5,323,257
[45] Date of Patent: Jun. 21, 1994

[54] MICROPHONE AND MICROPHONE SYSTEM

[75] Inventors: Kensaku Abe, Saitama; Yukimasa Yamaguchi; Kousuke Nakanishi, both of Tokyo, all of Japan

[73] Assignee: Sony Corporation, Tokyo, Japan

[21] Appl. No.: 924,457

[22] Filed: Aug. 4, 1992

[30] Foreign Application Priority Data

Aug. 9, 1991 [JP] Japan ................... 3-223728

[51] Int. Cl.$^5$ ............................ H04B 10/00
[52] U.S. Cl. ..................... 359/159; 359/172; 359/180; 381/172
[58] Field of Search ............ 359/51, 52, 62, 80, 359/142, 159, 172, 180, 237, 245, 325, 358; 381/168, 172, 175

[56] References Cited

U.S. PATENT DOCUMENTS

| | | | |
|---|---|---|---|
| 4,171,902 | 10/1979 | Imai et al. | 359/218 |
| 4,187,404 | 2/1980 | Deman et al. | 381/172 |
| 4,229,829 | 10/1980 | Grunwald | 359/172 |
| 4,479,265 | 10/1984 | Muscatell | 381/172 |
| 4,977,618 | 12/1990 | Allen | 359/172 |
| 4,977,619 | 12/1990 | Crimmins | 359/172 |
| 4,980,926 | 12/1990 | Noetzel | 359/159 |
| 5,247,580 | 9/1993 | Kimura et al. | 381/43 |

FOREIGN PATENT DOCUMENTS

| | | |
|---|---|---|
| 1547160 | 11/1969 | Fed. Rep. of Germany. |
| 63-105540 | 5/1988 | Japan ............ 359/172 |
| 8803658 | 5/1988 | PCT Int'l Appl. . |

*Primary Examiner*—Alpus H. Hsu
*Attorney, Agent, or Firm*—Lewis H. Eslinger; Jay H. Maioli

[57] ABSTRACT

An infrared-ray cordless microphone including a modulator for modulating an acoustic-to-electric converted sound signal through a predetermined process; and an infrared-ray transmitter for transmitting an output infrared signal obtained by converting the modulated sound signal from the modulator; wherein the infrared-ray transmitter is disposed at a lower end of the microphone body. There is also provided an infrared-ray cordless microphone system comprising such a microphone and a sound output means which includes an infrared-ray receiver for receiving the infrared signal from the microphone, a demodulator for demodulating the received infrared signal, and an electric-to-acoustic converter for converting the demodulated signal into a sound signal.

18 Claims, 20 Drawing Sheets

FIG. II

F I G. 18
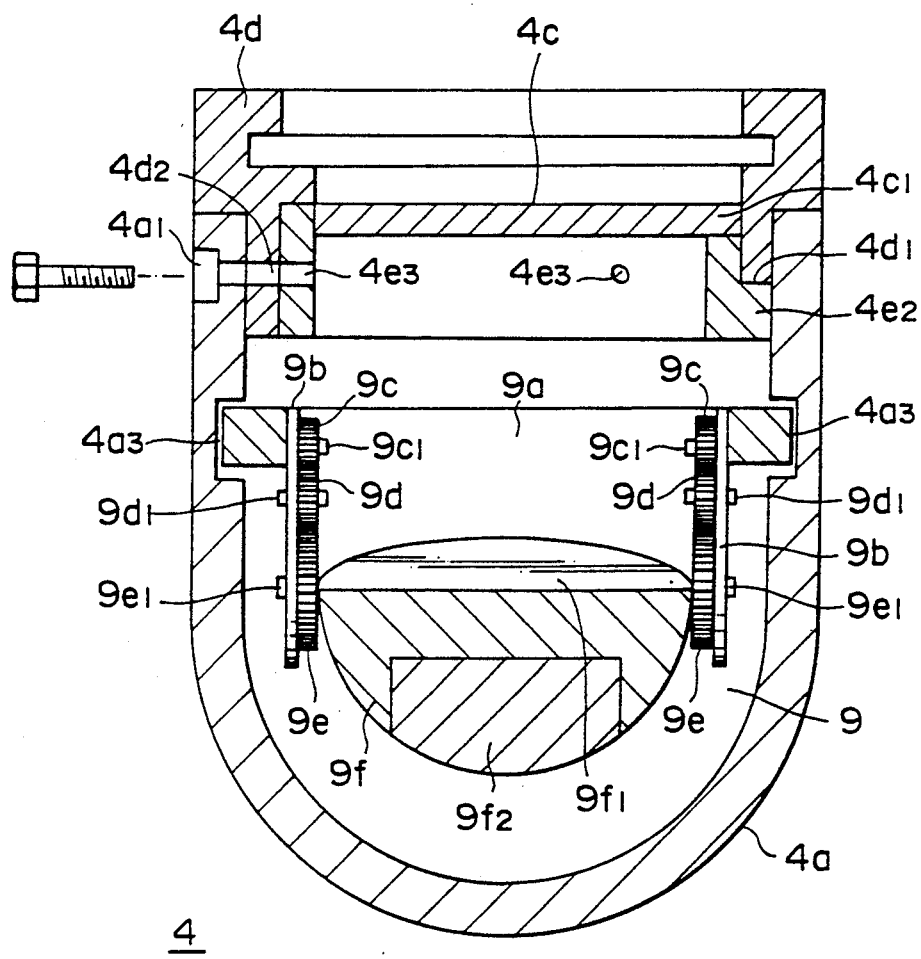

MICROPHONE AND MICROPHONE SYSTEM

BACKGROUND OF THE INVENTION

1. Field of the Invention

The present invention relates to a microphone for transmitting an input sound signal by the use of infrared rays, and also to a microphone system employing such a microphone therein.

2. Description of the Prior Art

It is generally noted of late that vocal and hand microphones are utilized in remarkably wide fields inclusive of public performances, lectures, conferences, karaoke (entertainment of singing songs over a prerecorded backing tape) and so forth. In the customary use of such microphone, there may arise, depending on individual situation, a problem of limitation in the user's action area due to the existence of cords for transmitting an input sound signal to an amplifier, a mixer and so on, and some more inconvenience is unavoidable with regard to entanglement of the cords. In view of the condition mentioned, there are known wireless type microphones which employ FM waves for eliminating the above drawbacks.

However, any wireless microphone using FM waves is permitted to output merely feeble waves because of the restriction by the Radio Regulation Law, so that the practically usable area is considerably limited. There is further needed an apparatus to receive the FM waves transmitted from the microphone and, since the transmitted signal is so feeble, the apparatus is required to have a high reception sensitivity. Due to such requirements, the apparatus is rendered considerably expensive, and therefore some difficulties are unavoidable in the operation of the above system by general users.

In addition, due to transmission of a sound signal by radio waves, the audio content naturally propagates also to the outside of the room where the microphone is used. For this reason, it is not exactly suited for use in a conference or the like where secrecy needs to be strictly observed, hence further limiting the usable area.

SUMMARY OF THE INVENTION

The present invention has been accomplished in view of the problems mentioned.

According to one aspect of the invention, there is provided an improved microphone which comprises modulator means for modulating an input sound signal through a predetermined process; and infrared-ray transmitter means for transmitting, as an infrared signal, the modulated signal obtained from the modulator means; wherein the modulator means is disposed at the lower end of a microphone body.

According to another aspect of the present invention, there is provided an improved microphone system with a receiving apparatus for transmitting a sound output of a cordless microphone which comprises modulator means for modulating an input sound signal through a predetermined process, and infrared-ray transmitter means for transmitting, as an infrared signal, the modulated signal obtained from the modulator means. In this system, the receiving apparatus comprises infrared-ray receiver means for receiving the infrared signal from the microphone; and demodulator means for recovering the sound signal by demodulating the received infrared signal through a predetermined process. And the receiving apparatus is capable of supplying the demodulated sound signal to predetermined sound signal processing means such as an amplifier, a mixer, a loudspeaker and so forth.

Owing to utilization of infrared rays in the cordless microphone system, it becomes possible to realize low-cost transmitter and receiver means with another advantage of maintaining complete secrecy in regard to the audio content.

Meanwhile with respect to the microphone, the infrared-ray transmitter means composed of light emitting diodes or the like is disposed at the lower end of the microphone body to consequently avert an impediment that the infrared-ray emitting region is covered with the user's hand. Furthermore, transmission of the infrared rays is not intercepted by the user's body since the infrared-ray emitting region is positioned farthest from the user during the operation.

The above and other features and advantages of the present invention will become apparent from the following description which will be given with reference to the illustrative accompanying drawings.

BRIEF DESCRIPTION OF THE DRAWINGS

FIG. 18 is a sectional view of the infrared-ray transmitter with the mirror unit in the microphone of the invention;

DESCRIPTION OF THE PREFERRED EMBODIMENTS

Hereinafter exemplary embodiments of the microphone and the microphone system according to the present invention will be described in detail with reference to FIGS. 1 through 25.

Figure 1:
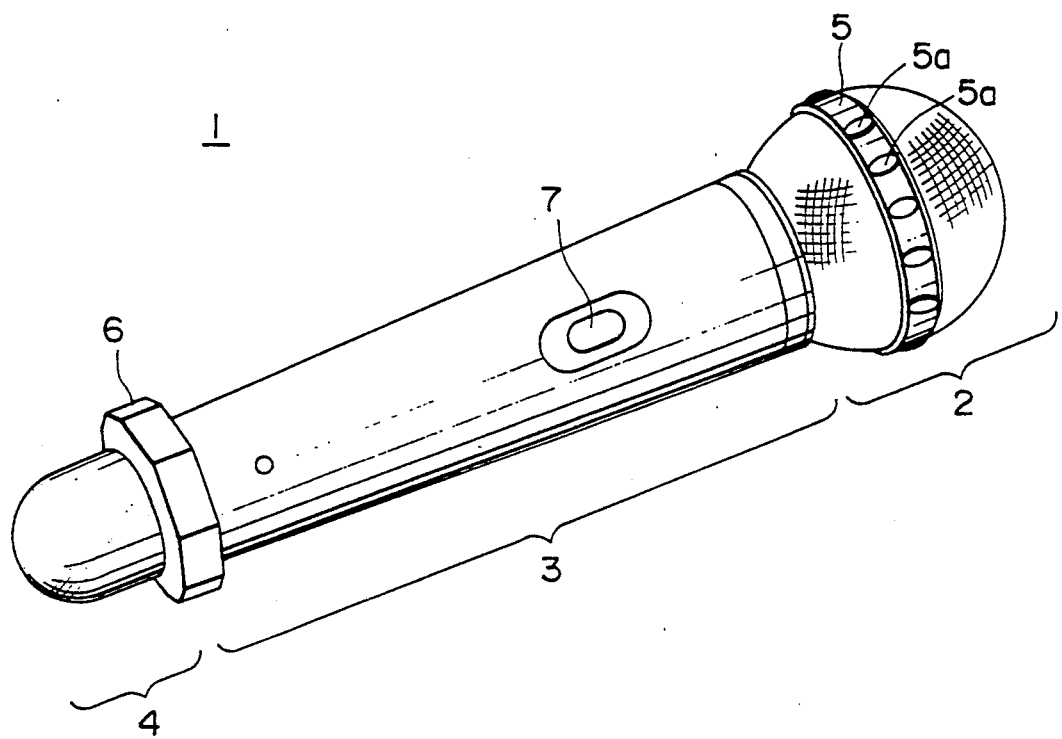
FIG. 1 is a perspective view of an exemplary embodiment representing the microphone of the present invention.
Figure 2:
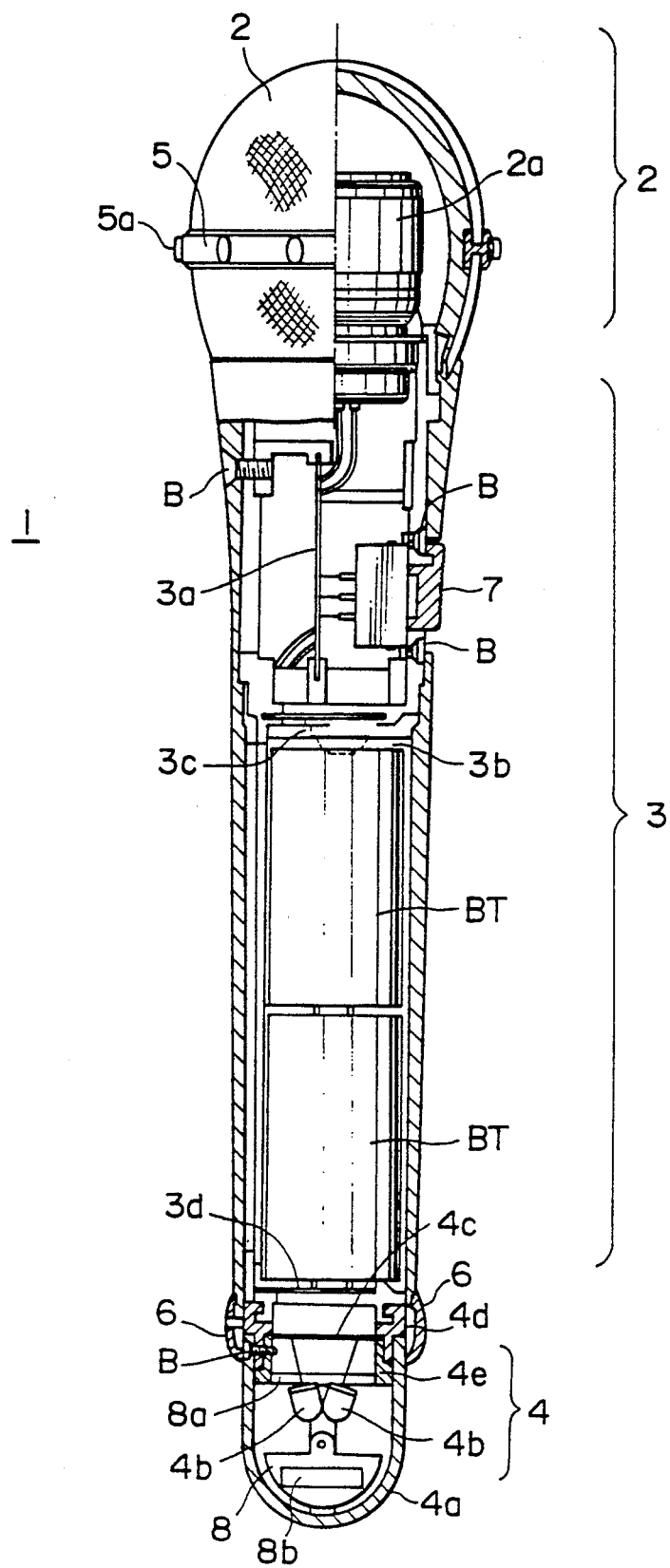
FIG. 2 schematically illustrates the internal structure in the microphone of the embodiment.
Figure 3:
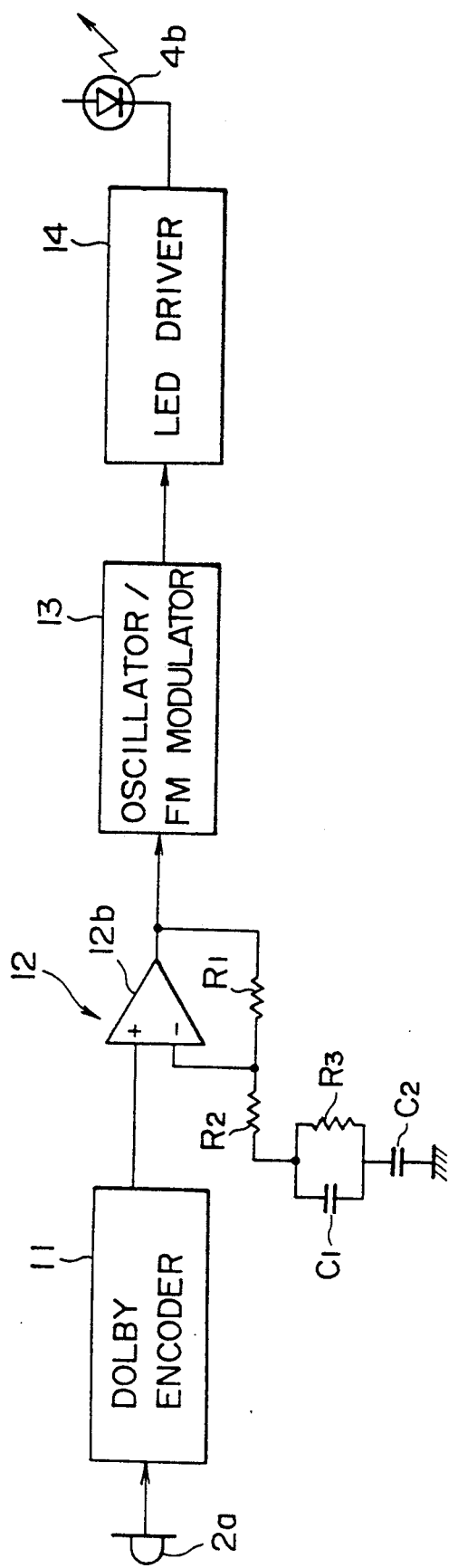
FIG. 3 is a block diagram showing the circuit configuration in the microphone of the embodiment.
Figure 4:
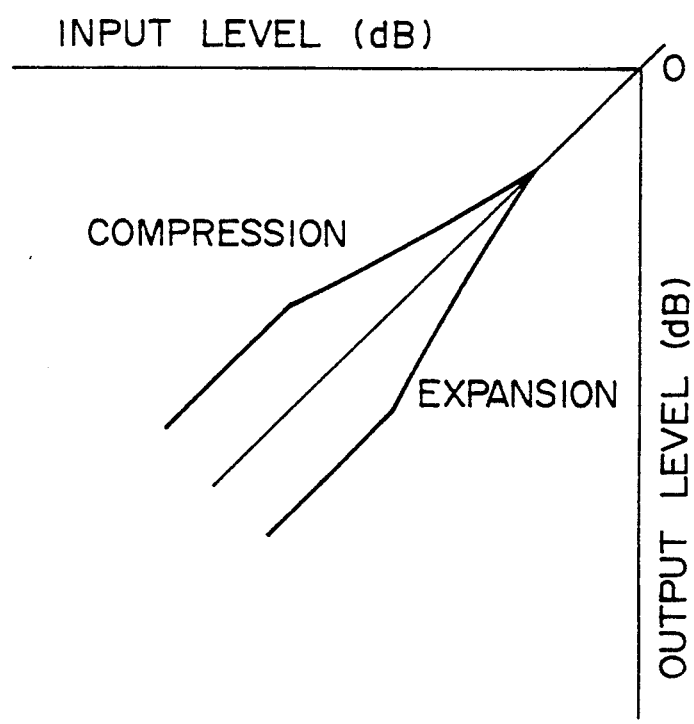
FIG. 4 graphically shows the compression-expansion characteristic in a C-type Dolby system.

First with regard to the constitution of the microphone, FIG. 1 is a perspective view of its embodiment. FIG. 2 schematically illustrates the structure of the microphone 1, and FIG. 3 is a block diagram showing the circuit configuration of the microphone 1.

As illustrated in FIG. 1, the microphone 1 comprises a sound transducer 2, a body 3 and an infrared-ray transmitter 4. A cushion belt 5 is attached to the sound transducer 2 in a manner to surround the same, and a rubber ring 6 is provided around the joint between the body 3 and the infrared-ray transmitter 4. Meanwhile a required number of bosses 5a are formed on the peripheral surface of the cushion belt 5. Reference numeral 7 denotes a control switch for turning on or off the operation of the microphone 1.

The internal structure of the microphone 1 is illustrated in FIG. 2. The sound transducer 2 incorporates a pickup unit 2a consisting of a diaphragm, a voice coil, a magnet and so forth for conversion of a received sound to output a corresponding electric signal.

In the body 3 is disposed a substrate 3a where various circuit elements (not shown) are mounted, and a battery compartment 3b is formed to accommodate a battery BT therein. Denoted by 3c, 3d are electrode plates in the battery compartment 3b.

The infrared-ray transmitter 4 disposed at a lower end of the body 3 is shaped into an elongated dome, and its cover 4a serving as an outer casing is composed of a selected material to permit permeation of at least infrared rays therethrough. And three light emitting diodes (LEDs) 4b for outputting infrared signals are incorporated in the transmitter 4. Denoted by 4c is a substrate for mounting thereon the LEDs 4b and required circuit component elements. The substrate 4c is held between a damper 4d of an elastic material such as elastomer and a presser ring 4e composed of a transparent ABS resin.

A typical material suited for the cover 4a is polycarbonate or Salloy (trade name) which is a mixture of acrylic resin and polycarbonate. However, Salloy is relatively fragile with respect to the mechanical strength although it is superior in the permeability to infrared rays and has a filter effect for cutting visible light. Meanwhile, polycarbonate is excellent in the permeability to infrared rays and has a sufficient mechanical strength, but it is rather inferior in the filter effect to cut visible light.

Any material for use as the cover 4a of the infrared-ray transmitter 4 in the microphone 1 needs to satisfy a predetermined condition relative to the ability to withstand dropping but is not exactly required to have a filter effect for cutting visible light, since it is not a light receiving means. Accordingly the use of polycarbonate is preferred. In this embodiment, therefore, the cover 4a is composed of polycarbonate in a thickness of 2 mm or so.

In the infrared-ray transmitter 4, there is provided a gyro mirror unit 8 for reflecting, in a predetermined direction, the infrared rays emitted from the LEDs 4b attached in a downward posture. The gyro mirror unit 8 consists of a support ring 8a and a horizontal member 8b. Its operation will be described later in detail.

The component mechanisms in the microphone 1 of such a structure are mutually joined and secured by means of screws B at predetermined positions.

The circuit configuration of the microphone 1 having the above-described structure is shown in a block diagram of FIG. 3. Upon conversion of an input sound signal into a corresponding electric signal (audio signal) by the pickup unit 2a in the sound transducer 2, the electric signal is supplied to each of the circuits formed on the substrate 3a incorporated in the body 3.

First the audio signal obtained from the pickup unit 2a is supplied to a Dolby encoder 11 which is based on the C type Dolby system. According to the C type Dolby system, as shown graphically in FIG. 4, a treble portion of the sound signal is compressed and expanded by 20 dB or so. With regard to such C type Dolby system, the detail is disclosed in, e.g., Japanese Patent Laid-open No. Sho 57 (1982)-41015.

The output of the Dolby encoder 11 is supplied to a preemphasis circuit 12. This circuit 12 serves to set a proper gain for controlling the signal level to a predetermined value and further performs preemphasis.

The preemphasis circuit 12 is constituted principally of an operational amplifier 12b. In this circuit, a feedback resistor R1 is connected between an output terminal and an inverting input terminal of the operational amplifier 12, and this inverting input terminal is connected to a resistor R3 and one end of a capacitor C1 via a resistor R2. Further the resistor R3 and the other end of the capacitor C2 are grounded via a capacitor C2. Such resistor R3 and capacitors C1, C2 constitute a preemphasis circuit.

The output of the preemphasis circuit 12 is supplied to an oscillator/FM modulator 13, which then oscillates a subcarrier (e.g., 3.2 MHz or 3.7 MHz) and frequency-modulates the same with the sound signal supplied thereto. The sound signal thus frequency-modulated is supplied to an LED driver 14. Then the LEDs 4b disposed in the infrared-ray transmitter 4 are driven to emit light in such a manner that the luminance thereof is changed in accordance with the FM sound signal.

Due to the above-described circuit configuration of the microphone 1 in this embodiment, the sound signal picked up by the transducer 2 is outputted as an infrared signal from the LEDs 4b in the infrared-ray transmitter 4.

Now a description will be given of a microphone system where such microphone is employed therein.

Figure 5:
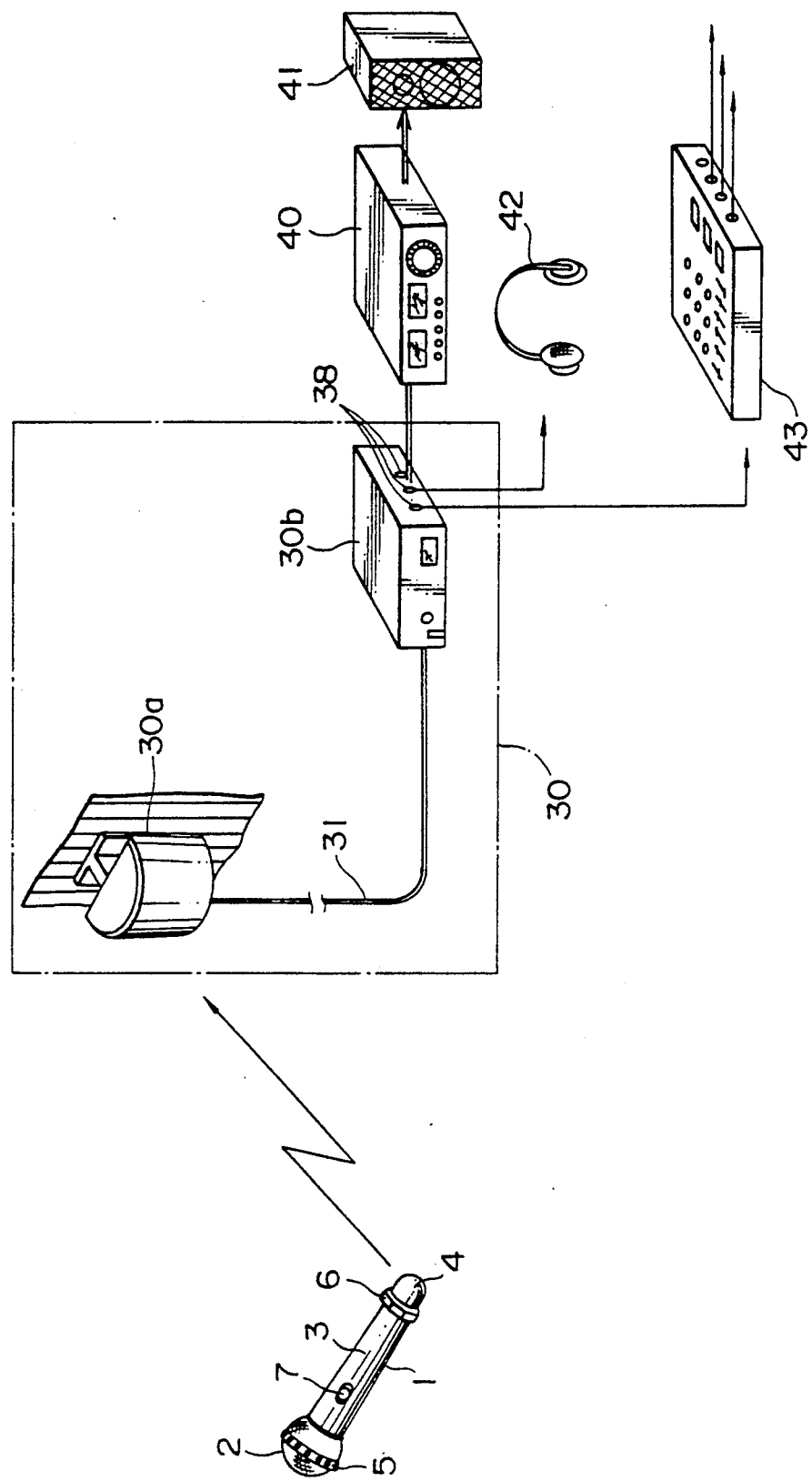
FIG. 5 illustrates the constitution of an exemplary embodiment representing the microphone system of the present invention.
Figure 6:
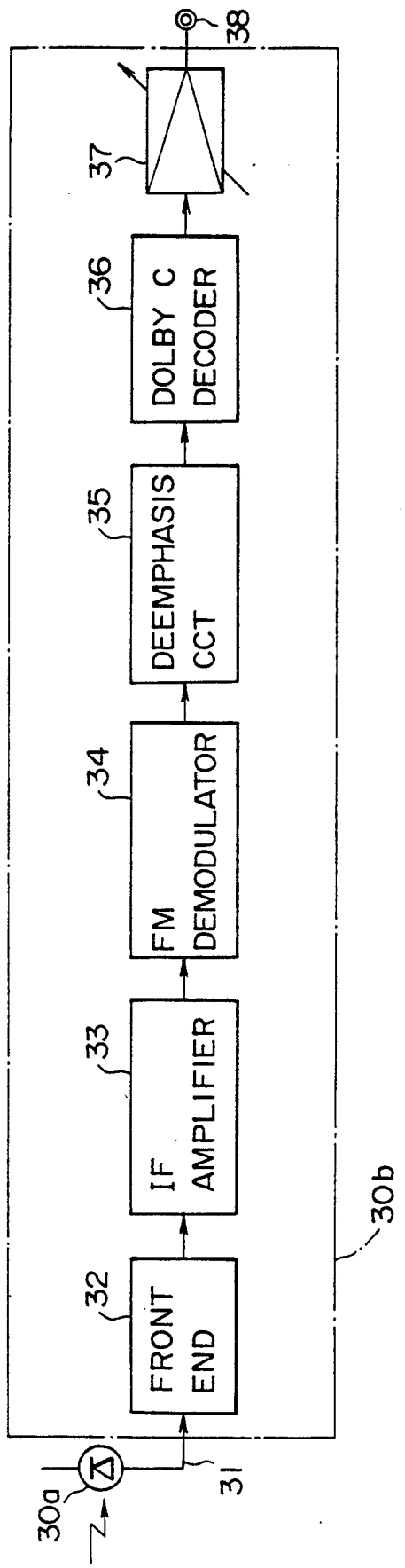
FIG. 6 is a block diagram showing the circuit configuration in a receiving apparatus employed in the microphone system of the invention.

FIG. 5 shows the constitution of a microphone system which comprises a microphone 1 and a receiving apparatus 30, and FIG. 6 is a block diagram showing the configuration of component circuits in the receiving apparatus 30.

In the receiving apparatus 30, an infrared-ray receiver 30a and a demodulator 30b are formed separately from each other. The infrared-ray receiver 30a incorporates a photodiode or the like therein to receive the infrared signal outputted from the microphone 1 and converts the same into a corresponding electric signal. The infrared-ray receiver 30a is shaped to be dimensionally small so that it can be attached to a wall or a ceiling in a room or can be installed at a desired position.

The electric signal obtained through the conversion in the infrared-ray receiver 30a is supplied via a cable 31 to the demodulator 30b.

The demodulator 30b is constituted as shown in FIG. 6, where the signal from the photodiode in the infrared-ray receiver 30a is first supplied to a front end circuit 32. Then the subcarrier frequency is selected in the front end circuit 32, and the signal of such selected frequency is converted by an intermediate frequency (IF) amplifier 33 into a predetermined IF signal.

The IF signal thus converted is supplied to an FM demodulator 34 so that the sound signal is recovered through demodulation. And further the demodulated signal is supplied via a deemphasis circuit 35 to a C type Dolby decoder 36 which is inverse in characteristic to the aforementioned Dolby encoder 13 in the microphone 1. Consequently the transmitted sound signal compressed by the Dolby encoder 11 is expanded to the original state. The sound signal outputted from the Dolby decoder 36 is level-controlled in an amplifier 37 and then is fed to a sound-signal output terminal 38.

As shown in FIG. 5, various devices are connectable to the sound-signal output terminal 38 of the demodulator 30b. For example, the sound signal delivered from the output terminal 38 is supplied to a loudspeaker 41 via an AV amplifier 40 connected thereto, so that the signal is outputted as a sound. If headphones 42 are connected to the sound-signal output terminal 38, the signal is outputted as a sound from the loudspeakers of the headphones. Furthermore the signal is reproducible as an audio output or is recordable when supplied either directly or via a mixer 43 to a loudspeaker or an audio recorder.

In the microphone system mentioned, the sound picked up by the microphone 1 is converted into an infrared signal and then is outputted therefrom, and such infrared signal is further received and demodulated by the receiving apparatus 30. Accordingly the sound signal obtained from the receiving apparatus 30 can be processed as desired by an individual device connected thereto in a manner to be recorded or reproduced as an audio output.

Thus, it becomes possible to realize an improved cordless microphone utilizing infrared rays, with a merit of enhancement in the usability of the microphone. Since it is not needed to limit the infrared output to a feeble level, there exists no necessity of setting the reception sensitivity of the receiving apparatus 30 particularly to a high value. Consequently an advantage is attainable in achieving curtailment in the production cost of the cordless microphone system. Furthermore, due to utilization of infrared rays, the signal is not transmitted to the outside of a room or any space partitioned with walls or the like, whereby strict secrecy can be observed.

If the system is so contrived that the carrier frequency is selectively changeable with regard to each microphone, sound outputs can be produced through respective receiving apparatus 30 by using a plurality of microphones 1 in one room without causing any mutual interference between transmitted signals.

Furthermore, a plurality of microphone systems can be used simultaneously by dividing the room into specific spaces even without changing the carrier frequency, since the directivity of the infrared output from the infrared-ray transmitter 4 is set in each of the microphones or the directivity is changeable in each microphone.

Figure 7:
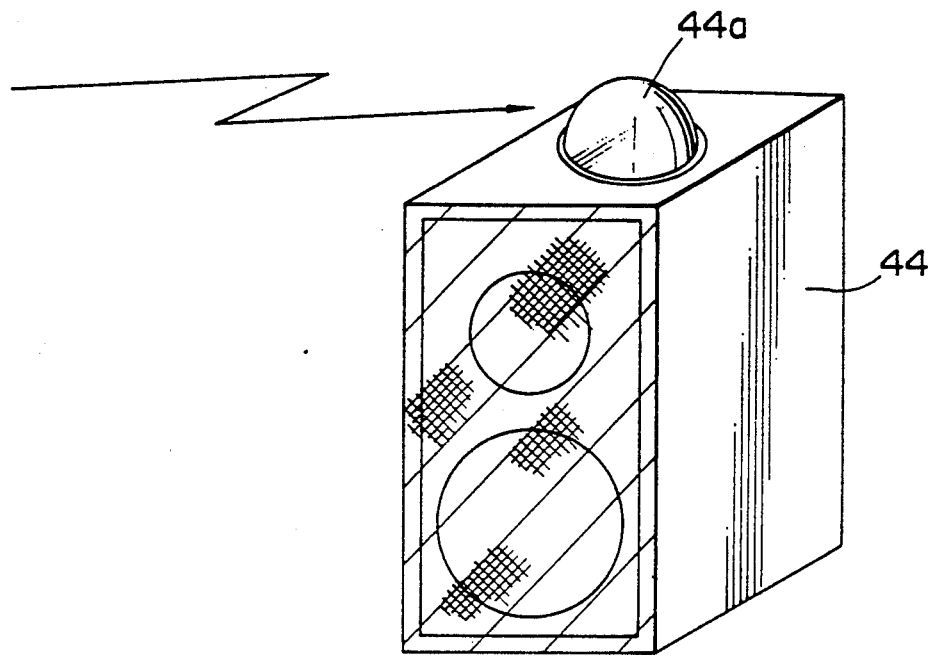
FIG. 7 is a perspective view of another embodiment representing the receiving apparatus in the microphone system of the invention.

Relative to the constitution of FIG. 5 where the receiving apparatus 30 comprises the infrared-ray receiver 30a and the demodulator 30b, there may be contrived a modification of FIG. 7 where an infrared-ray receiver 44a is disposed integrally with a housing of a loudspeaker unit 44, and the aforementioned demodulator circuit configuration of FIG. 6 (from the front end 32 to the amplifier 37) is incorporated so that the receiving apparatus is rendered capable of outputting the sound signal directly from the loudspeaker unit. In this modification, the cordless microphone system can be constituted of the simplest structure which consists merely of the microphone 1 and the loudspeaker unit 44, hence further enhancing the operational facility, general usability and convenience.

Figure 8:
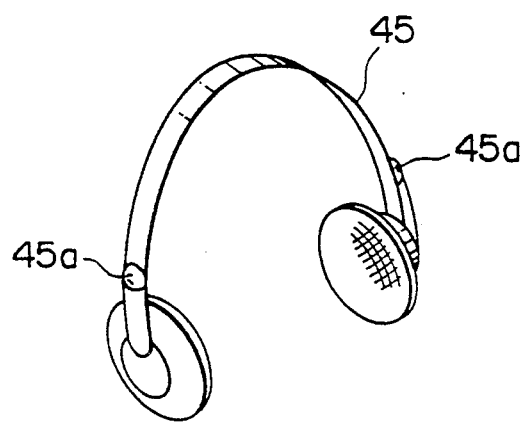
FIG. 8 is a perspective view of a further embodiment representing the receiving apparatus in the microphone system of the invention.

In another modification of FIG. 8, infrared-ray receivers 45a are disposed integrally with headphones 45, and the aforementioned demodulator circuit configuration (from the front end 32 to the amplifier 37) is incorporated to constitute a receiving apparatus, whereby a sound signal outputted from the microphone 1 is transmitted merely to a specific user furnished with the headphones 45.

In the microphone 1 of FIG. 1, the infrared-ray transmitter 4 is disposed at the lower end of the microphone body 3

Regarding the disposal of such infrared-ray transmitter in the microphone employed in the cordless microphone system of the present invention, the position of the infrared-ray transmitter is not exactly limited to the lower end of the microphone body alone, and it may be a center area of the body 3 or the vicinity of the cushion belt 5 provided around the sound transducer 2.

However, in the microphone 1 of this embodiment, the position of the infrared-ray transmitter 4 is specified particularly to the lower end of the microphone body to achieve the following advantages.

When the user grips the microphone 1, the lower end of the microphone body is a portion where the possibility of being covered with the user's hand is a minimum. In case the infrared-ray transmitter 4 is covered with the user's hand, transmission of the infrared signal to the receiving apparatus 30 fails to be properly performed, and therefore the lower end of the microphone body 3 is optimal for disposing the infrared-ray transmitter 4 since its probability of not being gripped is the highest.

When the user grips the microphone 1 by his hand or supports the same by means of a microphone holder or stand, the lower end of the microphone body is spaced apart farthest from the user's body and therefore has the least chance to induce interception of the infrared rays by the user's body. Accordingly it is regarded as the most suitable position for the infrared-ray transmitter 4 in practical use of the infrared-ray cordless microphone system.

For the reason mentioned above, there is attained an advantage that the best condition is maintained in the transmission by disposing the infrared-ray transmitter 4 at the lower end of the microphone body 3.

In the microphone 1 of this embodiment where the infrared-ray transmitter 4 is thus disposed at the lower end of the microphone body 3, the cushion belt 5 is provided around the sound transducer 2 as mentioned, and the rubber ring 6 is provided between the microphone body 3 and the infrared-ray transmitter 4.

The cushion belt 5 has a function of alleviating the shock noise generated when any impact is exerted on the sound transducer 2, and a predetermined number of projections 5a are formed on the peripheral surface of the cushion belt 5, thereby ensuring a function to prevent rolling of the microphone 1 when it is placed on a desk or the like.

The rubber ring 6 also has a rolling preventive function similarly to the cushion belt 5 and another function to protect the infrared-ray transmitter 4 while serving as a stopper of the grip position for the user.

Figure 9:
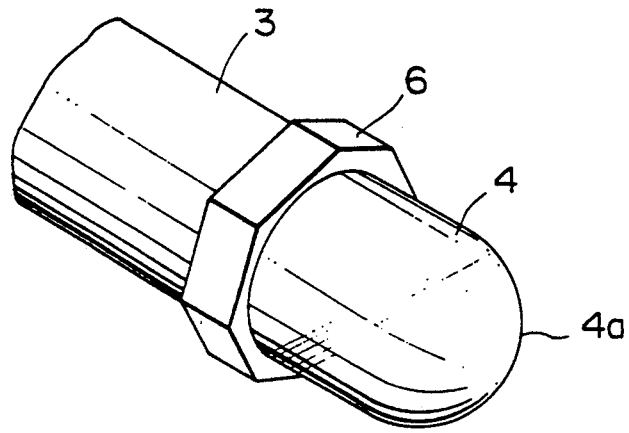
FIG. 9 is a perspective view of a lower end portion of the microphone.

As illustrated in FIG. 9, which is an enlarged view of the lower end portion of the microphone 1, the peripheral surface of the rubber ring 6 is shaped to be polygonal such as octagonal to thereby prevent rolling when the microphone is placed on a desk or the like. For attaining the rolling preventive function, the peripheral surface may be of any polygonal shape more than a triangle.

If the cushion belt 5 alone is sufficient to perform prevention of the rolling, the rubber ring 6 need not exactly have the rolling preventive function and may be circular for example in the shape of its peripheral surface.

Now a description will be given below with regard to the protective function for the infrared-ray transmitter 4 achieved by the rubber ring 6 which is so formed as to project from the peripheral surface of the microphone body 3.

The cover 4a for the infrared-ray transmitter 4 serves to protect the internal component elements and is finished to be lustrous in appearance with a planar or spherical smooth surface for sending the light efficiently. If the cover 4a for the infrared-ray transmitter 4 is scarred or stained, the light is reflected irregularly or the amount of the light transmittable through the cover 4a is reduced to consequently cause extreme deterioration of the light transmissivity.

Figure 10:
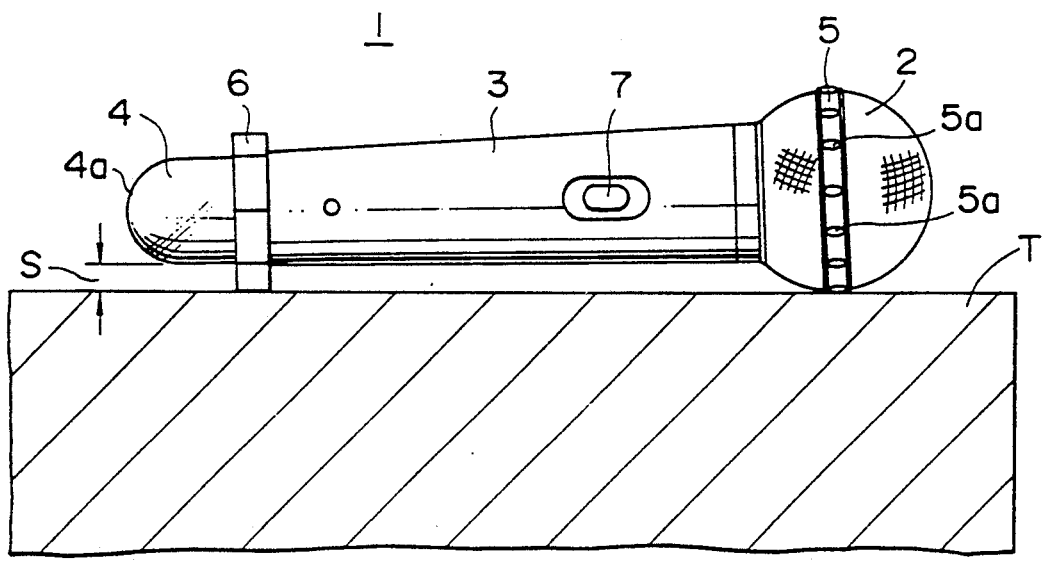
FIG. 10 is an explanatory diagram illustrating the function of a rubber ring used in the microphone of the invention.

In order to prevent any scar or stain on the cover 4a, when the microphone 1 is placed on a desk T for example as illustrated in FIG. 10, the rubber ring 6 serves as a spacer for retaining a space S so as to keep the cover 4a away from contact with the desk surface.

Since the cover 4a can thus be kept away from contact with the surface of a desk or the like, such a state is considerably effective for prevention of scar, stain and so forth to eventually maintain satisfactory transmission of infrared rays.

Furthermore, due to the existence of the rubber ring 6 between the infrared-ray transmitter 4 and the microphone body 3, the user is urged to grip the microphone body 3. In other words, such rubber ring 6 is effective to prevent a trouble that the infrared-ray transmitter 4 is covered with the user's hand to consequently interrupt proper arrival of the infrared signal at the receiving apparatus 30.

Even in case the infrared-ray transmitter 4 is not attached to the lower end of the microphone body 3, the function for protecting the infrared-ray transmitter 4 and the grip-position stopper function can still be realized by providing such rubber ring 6 in the vicinity of the infrared-ray transmitter 4. And the rubber ring 6 need not exactly be polygonal in the shape of its peripheral surface for achieving the functions mentioned. It is a matter of course that the ring 6 need not be composed of an elastic material such as rubber.

In the embodiment described above, the function for protecting the infrared-ray transmitter 4 and the grip-position stopper function are achieved by means of the rubber ring 6. However, the same functions are also attainable by, besides a ring-shaped means such as the rubber ring 6, a required number of bosses of a suitable shape formed in the vicinity of the infrared-ray transmitter 4 for example.

In the microphone 1 of this embodiment, the LEDs 4b are so disposed as to turn downward as shown in FIG. 2, and the infrared output emitted from such LEDs 4b is sent via a gyro mirror unit 8 which reflects the infrared rays in a predetermined direction.

With respect to the internal mechanism of the infrared-ray transmitter 4, it is possible to send infrared rays merely by means of the LEDs 4b without such gyro mirror unit 8. However, a variety of advantages are achievable by adopting a novel structure which includes the LEDs 4b turned downward and the gyro mirror unit 8 where the mirror surface thereof serving as a reference for the infrared-ray output direction is always maintained at a predetermined angle in a horizontal direction. Hereinafter a description will be given with regard to the gyro mirror unit 8 and the advantages attained by employing the same.

Figure 11:
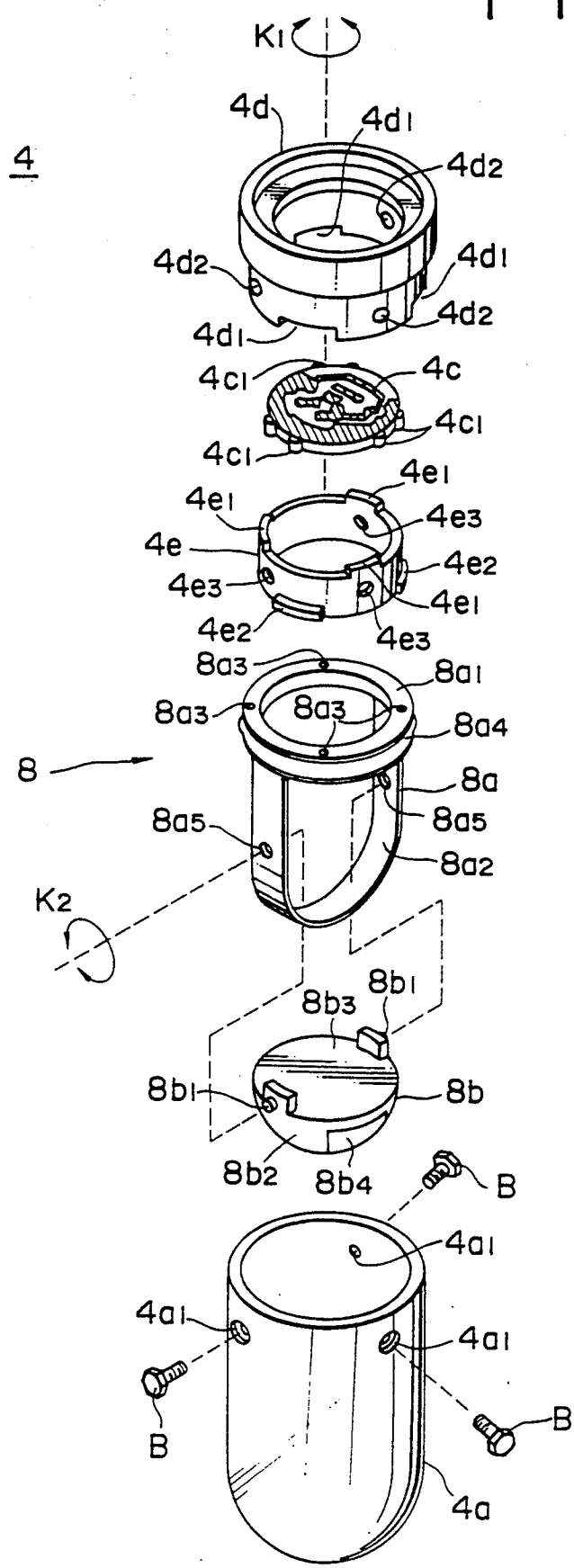
FIG. 11 is an exploded perspective view of an infrared-ray transmitter with a gyro mirror unit in the microphone of the invention.
Figure 12:
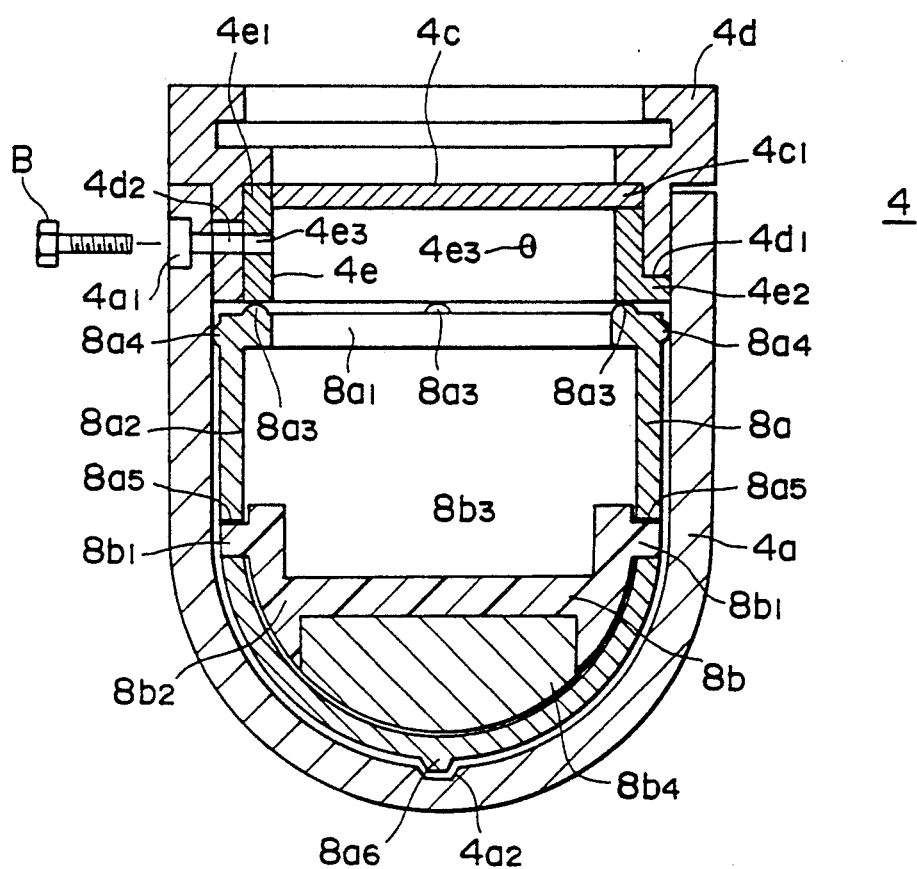
FIG. 12 is a sectional view of the infrared-ray transmitter with the gyro mirror unit in the microphone of the invention.

FIG. 11 is an exploded perspective view of the internal mechanism in the infrared-ray transmitter 4, and FIG. 12 is a sectional view of such internal mechanism in an assembled state.

A substrate 4c, on which LEDs 4b (not shown) are so mounted as to turn downward, is inserted from below into a damper 4d together with a presser ring 4e in such a manner that projections 4c₁ formed on the peripheral surface are spaced apart from ridges 4e₁ on the upper surface of the presser ring 4e, i.e., in a state where the respective upper planes of the ridges 4e₁ and the substrate 4c are substantially flush with each other and, as illustrated in FIG. 12, the substrate 4c is held between the damper 4d and the presser ring 4e.

In this state, lower recesses 4d₁ formed in the damper 4d and lower lugs 4e₂ on the peripheral surface of the presser ring 4e are fitted to each other. With such fitting, the damper 4d and the presser ring 4e are positioned in the circumferential direction, whereby tapped holes 4d₂ formed in the damper 4d in three directions (at 120° angular intervals) are brought into positional coincidence with tapped holes 4e₃ formed in the presser ring 4e in three directions (at 120° angular intervals).

The tapped holes 4d₂ in the damper 4d and the tapped holes 4e₂ in the presser ring 4e are further brought into positional coincidence with tapped holes 4a₁ formed in the cover 4a for the infrared-ray transmitter 4 in three directions (at 120° angular intervals), and screws B are inserted into such holes 4a₁, 4e₁ and 4d₂ so that the damper 4d and the presser ring 4e are secured fixedly in the cover 4a while holding the substrate 4c therebetween.

A support ring 8a is disposed under the presser ring 4e. The support ring 8a is composed of colorless transparent ABC resin or the like and comprises a ring portion $8a_1$ and a U-shaped horizontal-member support portion $8a_2$ positioned under the ring portion $8a_1$. Slide protrusions $8a_3$ are formed on the upper surface of the ring portion $8a_1$, and a slide ridge $8a_4$ is formed on the peripheral surface thereof.

Furthermore, axial bores $8a_5$ for pivotally supporting a horizontal member 8b are formed in the support portion $8a_2$, and an axial projection $8a_6$ is formed in the lowermost region of the U-shaped horizontal-member member support portion $8a_2$.

As illustrated in FIG. 12, the support ring 8a is kept in contact with the bottom surface of the presser ring 4e at the slide protrusions $8a_3$ while being kept in contact also with the inner surface of the cover 4a at the slide ridge $8a_4$, but is not fixed at the axial projection $8a_6$ while being loosely fitted into an axial recess $4a_2$ formed in the lowermost region of the inner surface of the cover 4a. Therefore the support ring 8a is rendered rotatable in the direction indicated by an arrow K1 in FIG. 11 with respect to the center axis of the body 3 of the microphone 1.

The horizontal member 8b is pivotally held by the horizontal-member support portion $8a_2$ of the support ring 8a. More specifically, projections $8b_1$ to be inserted into the axial bores $8a_5$ are formed on the horizontal member 8b, which is thereby rendered rotatable in the direction indicated by an arrow K2 in FIG. 11 with respect to the center axis of the projections $8b_1$.

The drum $8b_2$ of the horizontal member 8b is shaped to be hemispherical, and its upper surface is used as a mirror $8b_3$. Meanwhile a lower portion of the hemispherical drum $8b_2$ is formed of a weight $8b_4$.

In the infrared-ray transmitter 4 of the structure mentioned above, the light output emitted from the LEDs 4b attached to the substrate 4c can be transmitted always in a predetermined directional range by the gyro mirror unit 8 consisting of the support ring 8a and the horizontal member 8b.

The desired operation is performed due to the novel constitution where the support ring 8a is rotatable in the direction of the arrow K1 while the horizontal member 8b is also rotatable in the direction of the arrow K2, and the weight $8b_4$ is provided in the lower portion of the horizontal member 8b, so that the mirror $8b_3$ on the upper surface of the horizontal member 8b can be maintained in its horizontal posture regardless of the angle of the microphone 1 which is gripped by the user's hand or is held by a microphone stand or the like in any of the directions K1 and K2.

Figure 13A:
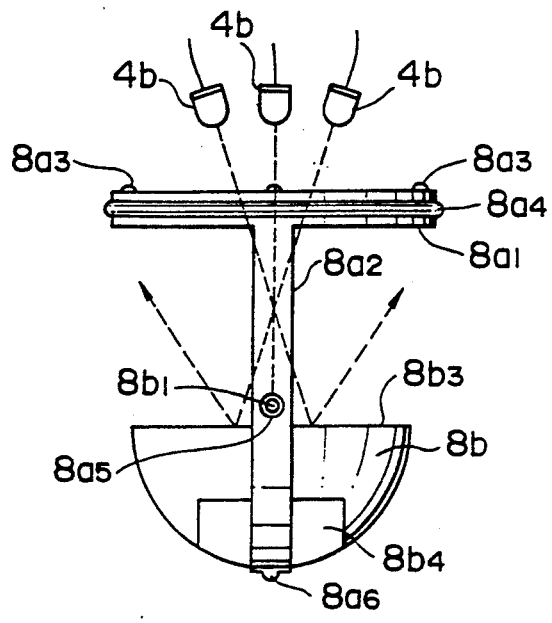
FIGS. 13A to 13C illustrate the operation of the gyro mirror unit in the embodiment.

When the microphone 1 is in a perpendicular posture as illustrated in FIG. 13A for example, the mirror $8b_3$ is held orthogonally to the body 3 of the microphone 1, and the light output emitted from the LEDs 4b attached under the substrate 4c at an angle of 10° or so is reflected by the mirror $8b_3$ at a predetermined angle and then is sent out through the cover 4a of the infrared-ray transmitter 4.

Figure 13B:
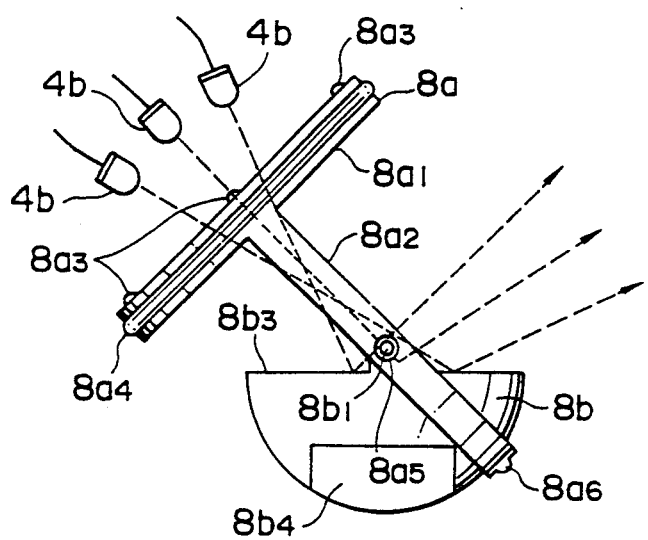

If the microphone 1 is tilted by 45° to any direction from such state, the support ring 8a is rotated by a predetermined angle in the direction K1 due to the action of the weight $8b_4$ while the horizontal member 8b is rotated by a predetermined angle in the direction K2, so that the mirror $8b_3$ can be maintained in its horizontal posture as illustrated in FIG. 13B. In this case also, the light output emitted from the LEDs 4b is reflected by the mirror $8b_3$ at the predetermined angle and then is sent out through the cover 4a of the infrared-ray transmitter 4.

Figure 13C:
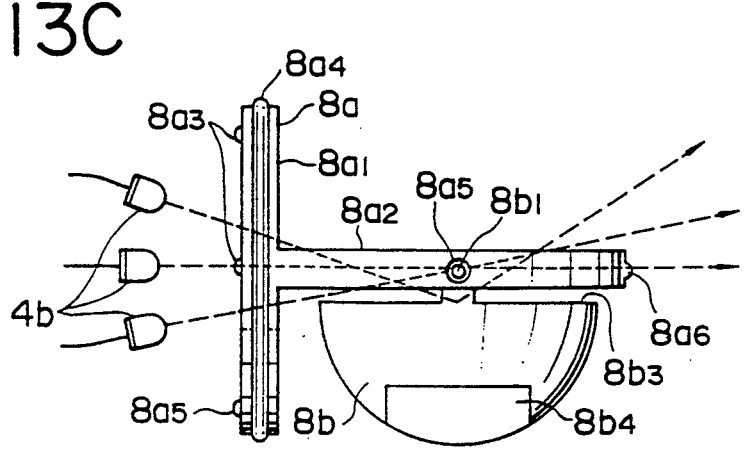

When the microphone 1 is further tilted by 90° in any direction, the support ring 8a and the horizontal member 8b are rotated by the predetermined angle respectively due to the action of the weight $8b_4$ similarly to the foregoing case, so that the mirror $8b_3$ is maintained in its horizontal posture as illustrated in FIG. 13C.

In this case, the light output emitted from the LEDs 4b is reflected by the mirror $8b_3$ at the predetermined angle or is passed directly through the cover 4a and then is sent out from the infrared-ray transmitter 4.

Figure 14:
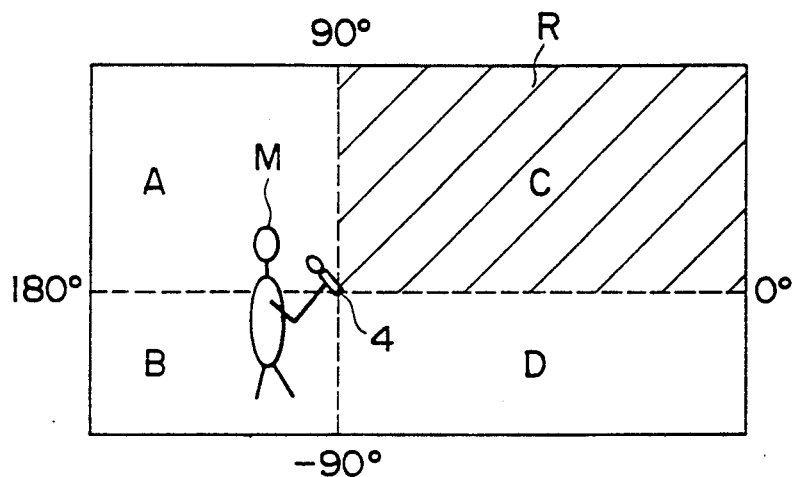
FIG. 14 illustrates areas of irradiation by the gyro mirror unit in the embodiment.

Since the mirror $8b_3$ is thus retained to be horizontal, when the microphone 1 is used in a room R as shown in FIG. 14 for example, the infrared signal obtained from the infrared-ray transmitter 4 is outputted always within an oblique-line area C (i.e., in a forward vertical angular range of 0° to 90° as viewed from the user M).

In the example of FIG. 13A, the infrared signal is outputted further beyond the forward vertical angular range of 0° to 90°. However, no strict consideration is necessary with regard to this point since there exists substantially no chance of using the microphone 1 in a completely perpendicular posture. Even in case the microphone is used in a perpendicular posture, the signal is still outputted in a forward vertical angular range of 0° to 90° as well, so that there arises no problem at all.

The following advantages are achievable by transmitting an infrared output within a forward vertical angular range of 0° to 90° from the microphone 1 of the embodiment.

Usually in the room M, some obstacles such as desks, chairs, furnitures and so forth are existent against propagation of the infrared rays within a range of 1 to 15 meters on the floor (area D). Therefore, if the infrared rays are outputted from the microphone 1 toward the area D, the transmission efficiency is extremely deteriorated.

Behind the user M (in areas A and B) where the user himself is an obstacle, any infrared output toward the areas A and B is substantially useless.

If the receiving apparatus 30 is installed in the area A, B or D, satisfactory arrival of the infrared output is not exactly expectable. Conversely, transmission to the area C alone is most efficient. For spreading the output directivity in order to send the infrared rays also to the areas A, B and D, it is necessary to employ several LEDs having a wide directivity with a high-intensity output or a multiplicity of LEDs each having a narrow directivity, hence inducing various disadvantages such as larger dimensions of the infrared-ray transmitter, a rise of the production cost and an increase in the power consumption.

In view of such circumstances, the embodiment of the present invention employs the gyro mirror unit 8 to perform proper transmission of an infrared output merely in a forward vertical angular range of 0° to 90° where the transmission is most efficient, so that it becomes possible to constitute a desired light emitting means by the use of only three LEDs each having a narrow directivity to consequently attain merits of lowering the production cost of the light emitting means, diminishing the power consumption and reducing the dimensions of the structure.

The LEDs 4b can be attached to turn downward under the substrate 4c by the provision of such gyro mirror unit 8. More specifically, the infrared output direction of the LEDs 4b may be kept downward in the microphone 1 without the necessity of being horizontal or upward, so that the substrate 4c can be disposed in the proximity of the microphone body 3 to consequently ensure remarkable facility in designing the substrate or setting the assembling work.

It is to be understood that the shapes of the support ring 8a and the horizontal member 8b constituting the gyro mirror unit 8 are not limited to those adopted in the embodiment mentioned, and the method of supporting the same in a rotatable manner is not limited to the aforementioned example alone either. The requirements can be satisfied in other modifications on condition that the horizontal member 8b can be retained in its horizontal posture. Namely, the requirements can be met if the mirror unit is rotatable in the direction K1 or K2 by the action of the weight disposed under the mirror.

Figure 15:
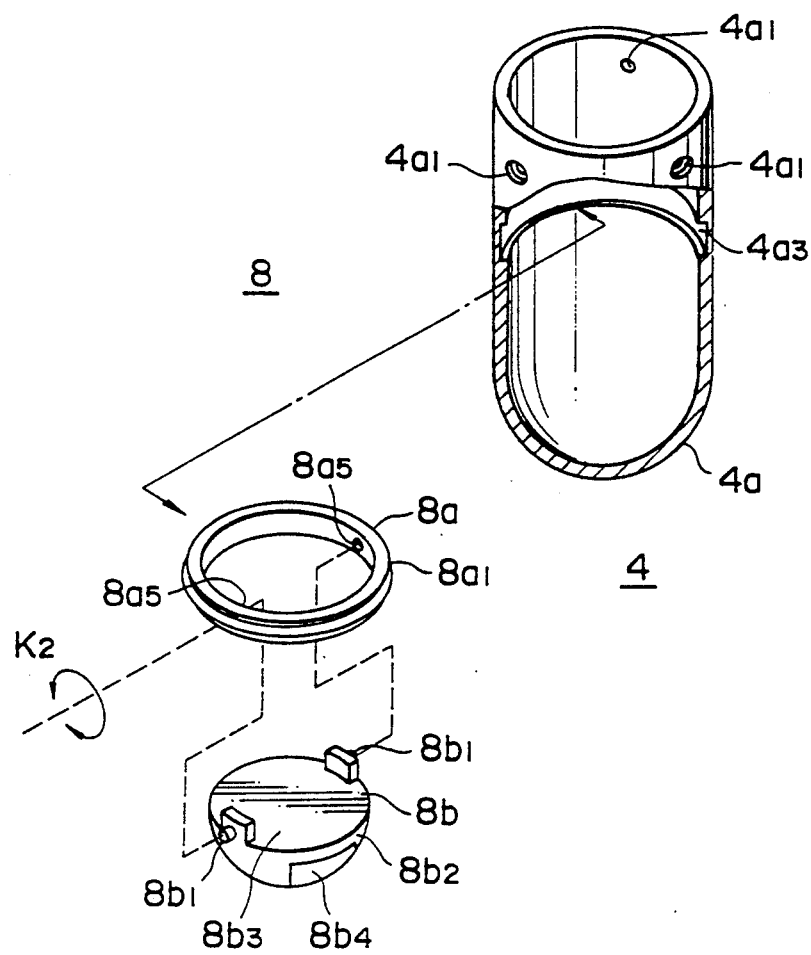
FIG. 15 illustrates another gyro mirror unit employed in the embodiment.

For example, a modified gyro mirror unit 8 having the same function as the above is illustrated in FIG. 15, wherein a groove $4a_3$ is formed circularly along the inner surface of the cover 4a, and the support ring 8a is constituted merely of a ring $8a_1$ fitted loosely in the groove $4a_3$ in a manner to be rotatable in the direction K1.

In this example, a projection $8b_1$ serving as the axis of rotation of the horizontal member 8b in the direction K2 is supported by nonthrough axial bores $8a_5$ formed in the inner surface of the support ring 8a.

Figure 16:
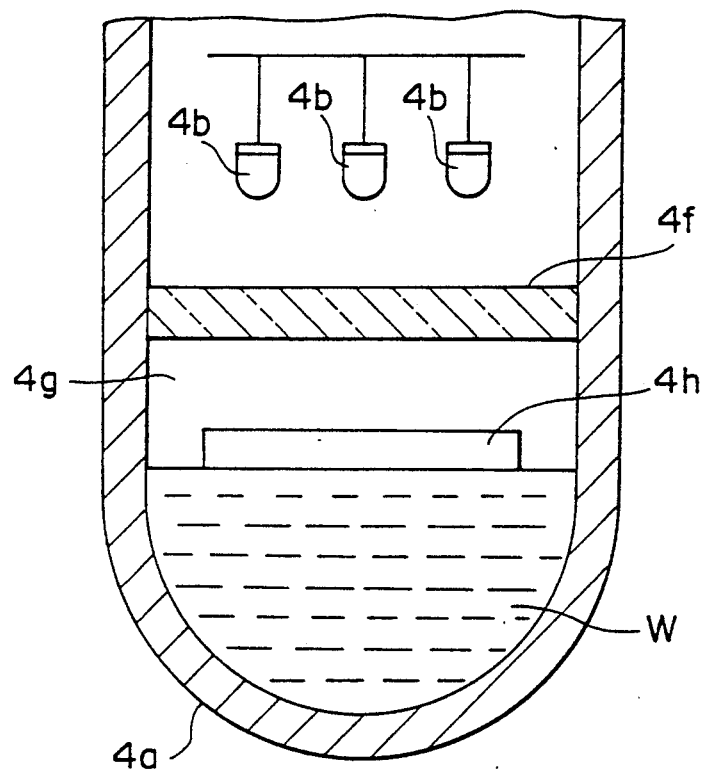
FIG. 16 illustrates a further gyro mirror unit employed in the embodiment.

In another modification of FIG. 16 using no such biaxial gyro unit, a hermetic space 4g is defined by a transparent member 4f in the cover 4a, and a liquid W is sealed up in such hermetic space 4g. Further a mirror 4h is provided therein to float on the surface of the liquid W, whereby a reflecting specular plane retained always in a horizontal posture can be formed by the mirror 4h. When the liquid sealed up in the hermetic space is a metal such as mercury, the liquid itself serves as a reflecting specular plane to consequently eliminate the necessity of the mirror 4h.

In the biaxial gyro mirror unit 8 mentioned above, the mirror $8b_3$ is not limited to the one formed horizontally on the top surface of the horizontal member 8b and, in accordance with the individual use of the set condition of the microphone system (e.g., the position of the receiving apparatus 30), any other mirror $8b_3$ may be formed on the top surface of the horizontal member 8b in such a manner as to have a predetermined angle to the horizontal direction, whereby the output angular range of the infrared signal can be shifted upward or downward from the forward vertical angular range of 0° to 90°.

In a further modification, a substrate with LEDs attached thereto may be disposed on the top surface of the horizontal member 8b at a predetermined upward angle without using any mirror. In this structure also, the infrared output can be transmitted within a forward vertical angular range of 0° to 90°.

In the microphone 1 of the above embodiment, the top surface (i.e., mirror) of the horizontal member serving as an infrared-ray reflecting specular surface in the infrared-ray transmitter 4, or the top surface of the horizontal member for mounting the LEDs thereon, is maintained at a predetermined angle to the horizontal direction to consequently realize transmission of the infrared output always within a predetermined angular range.

In the infrared-ray transmitter 4 having the gyro mirror unit 8 of the above structure, the infrared output is transmitted in a forward vertical angular range of 0° to 90°. However, depending on the system condition where the position of, e.g., the receiving apparatus 30 is fixed, it is preferred that the angular range of the infrared output transmission be further defined. Namely, even if low-output LEDs are employed in the infrared-ray transmitter 4, a high reception efficiency is still achievable in the receiving apparatus 30 by concentrating the infrared output, and the light reception directivity of the apparatus 30 can be narrowed while the number and the positions of installable apparatus 30 can be restricted to eventually accomplish an improved infrared-ray cordless microphone system of a higher performance at curtailed production cost.

Figure 17:
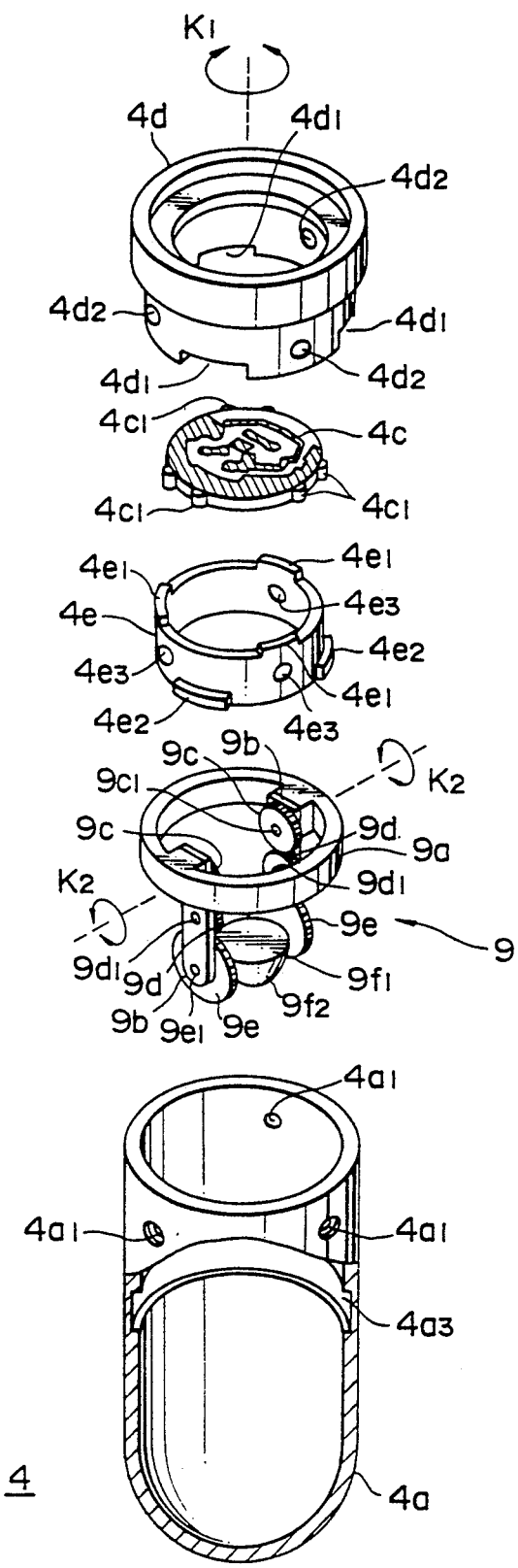
FIG. 17 is an exploded perspective view of an infrared-ray transmitter with a mirror unit in the microphone of the invention.

FIG. 17 is an exploded perspective view of the internal mechanism in the infrared-ray transmitter 4 having a mirror unit 9. For the purpose of transmitting the infrared output always in a given direction, the mirror unit 9 consists of a first rotary assembly rotatable in the direction K1 in accordance with the rotation of the microphone 1 in the circumferential direction (K1) thereof, and a second rotary assembly rotated in the direction K2 by ½ angle of the rotation of the microphone 1, and further a mirror is mounted thereon. FIG. 18 is a sectional view of the internal mechanism in an assembled state. In these diagrams, the same component elements as those used in FIGS. 11 and 12 are denoted by the same reference numerals, and a repeated explanation thereof is omitted here. Also in the diagrams, LEDs 4b are not shown.

In the infrared-ray transmitter 4, a substrate 4c with LEDs 4b attached thereto is held by the combination of a damper 4d and a presser ring 4e, and a circular groove $4a_3$ is formed along the inner surface of the cover 4a for the infrared-ray transmitter 4, so that the mirror unit 9 is supported by the groove $4a_3$.

The mirror unit 9 is so held as to be rotatable in the direction K1 with its slide ring 9a being loosely fitted into the groove $4a_3$. A pair of gear support plates 9b are disposed in the proximity of the inner surface of the slide ring 9a, and three gears 9c, 9d and 9e are kept in engagement with each of the support plates 9b. Inside the gear 9e, there is attached a substantially hemispherical reflector 9f whose top surface serves as a mirror $9f_1$. The mirror $9f_1$ is formed on the top surface of the reflector 9f in a manner to have an oblique plane at an angle of 30° with the horizontal direction, and a weight $9f_2$ is provided in a lower portion of the reflector 9f.

In the mirror unit 9, the gear 9c and the slide ring 9a are attached via an axial pin $9c_1$ thereby being fixed, so that the gear 9c is not rotatable with respect to the slide ring 9a. However, the gear support plate 9b interposed between the gear 9c and the slide ring 9a is pivotally supported by means of the pin $9c_1$ and is therefore rotatable in the direction K2 with respect to the slide ring 9a.

The gears 9d and 9e are pivotally supported by means of axial pins $9d_1$ and $9e_1$ respectively and are therefore rendered rotatable to the support plate 9b. The gears 9c and 9d have the same number of teeth, whereas the number of teeth of the gear 9e is so set as to be double that of the gears 9c and 9d. And the reflector 9f is fixedly secured to the gear 9e.

Figure 19A:
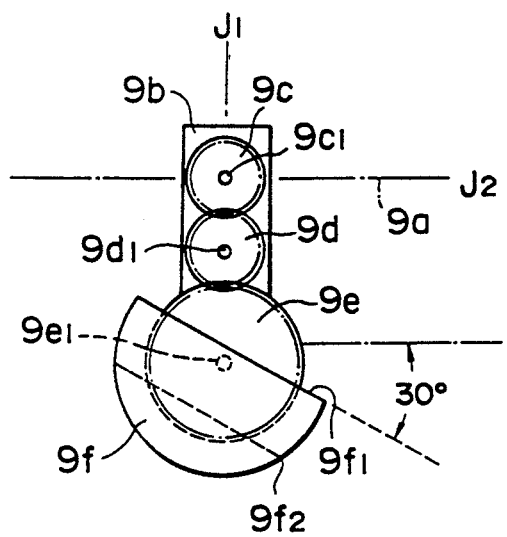
FIGS. 19A to 19C illustrate the operation of the mirror unit in the embodiment.
Figure 19B:
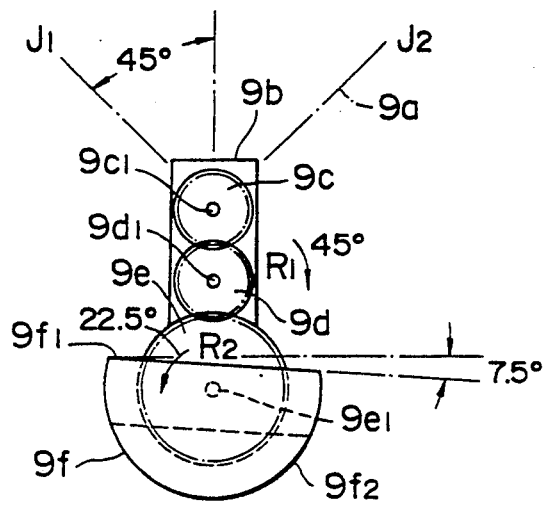
Figure 19C:
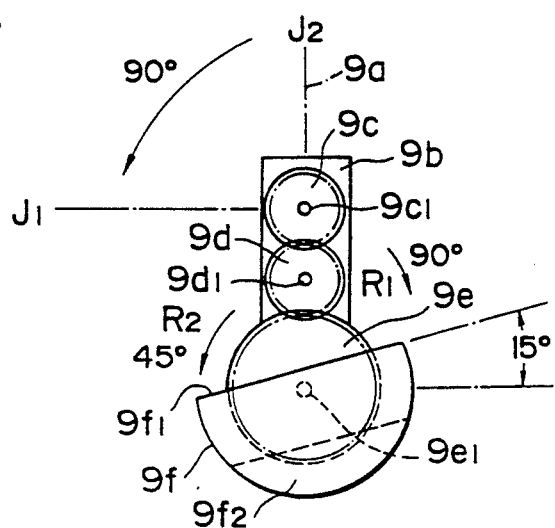

FIGS. 19A to 19C illustrate how the angle of the mirror $9f_1$ is changed in such mirror unit 9. In the diagrams, J1 denotes the center axis of the microphone 1, and J2 denotes the positional state of the slide ring 9a always retained to be orthogonal to the center axis J1.

As illustrated in FIG. 19A, when the microphone 1 is in a perpendicular posture, the mirror $9f_1$ is inclined downward at an angle of 30° with the horizontal direction. (In FIGS. 19A to 19C, the right side corresponds to the front for the microphone 1.) If the microphone 1 is tilted by, e.g., 45° in any direction, first the slide ring 9a is rotated by a predetermined angle due to the action of the weight $9f_2$ as illustrated in FIG. 19B, and the gear support plate 9b is rotated by 45° to the slide ring 9a.

Since the gear 9c is secured fixedly to the slide ring 9a, the gear 9d engaged with the gear 9c and rotatable to the gear support plate 9b is rotated by 45° in the direction R1. And then the gear 9e having a double gear ratio is rotated by 22.5° in the direction R2 in accordance with the 45° rotation of the gear 9d. Consequently the reflector 9 secured fixedly to the gear 9e is also rotated by 22.5° in the direction R2, so that the mirror $9f_1$ is inclined downward at an angle of 7.5° with the horizontal direction toward the front of the microphone 1 (rightward in the diagram).

When the microphone 1 is further tilted by 90° in any direction as illustrated in FIG. 19C, first the slide ring 9a is rotated by a predetermined angle due to the action of the weight $9f_2$, and the gear support plate 9b is rotated by 90° to the slide ring 9a. Therefore the gear 9d is rotated by 90° in the direction R1 while the gear 9e is rotated by 45° in the direction R2, whereby the reflector 9f secured fixedly to the gear 9e is also rotated by 45° in the direction R2. As a result, the mirror $9f_1$ is inclined upward at an angle of 15° with the horizontal direction toward the front of the microphone 1.

Figure 20A:
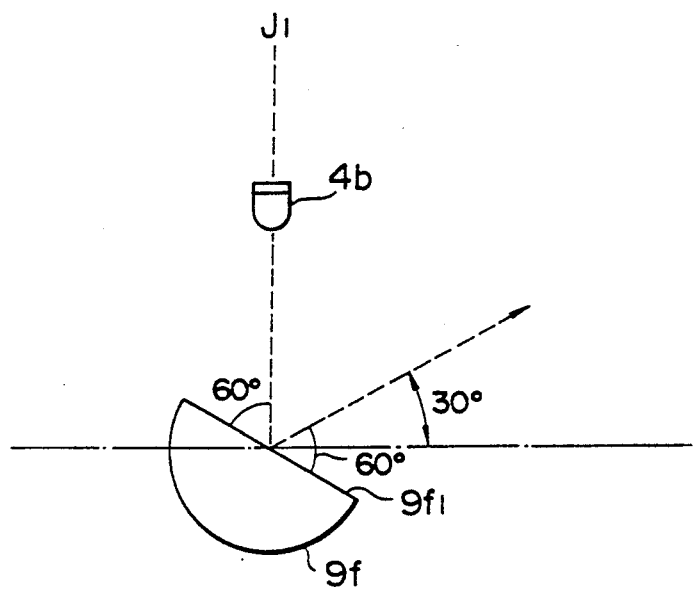
FIGS. 20A to 20C also illustrate the operation of the mirror unit in the embodiment.
Figure 20B:
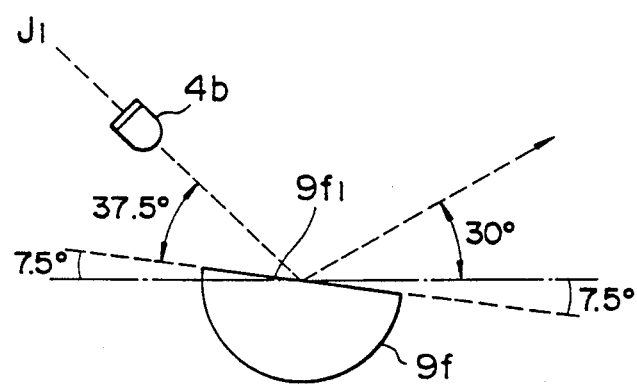
Figure 20C:
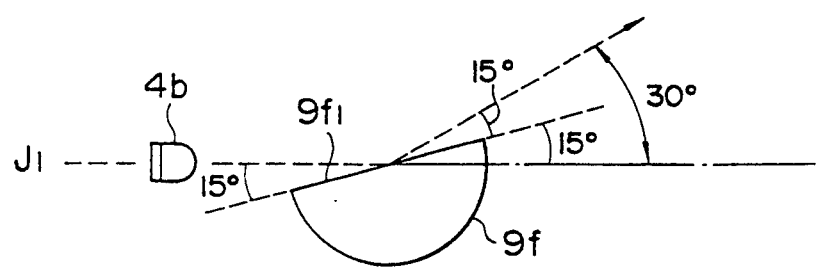

FIGS. 20A to 20C illustrate how the direction of the infrared output is changed in conformity with changes in the inclination angle of the mirror $9f_1$ mentioned above. FIG. 20A represents an exemplary case corresponding to FIG. 19A where the microphone is held in its perpendicular posture. In this case, the mirror $9f_1$ is inclined downward at 30° with the horizontal direction, so that the infrared rays outputted from the LEDs 4b are incident upon and reflected by the mirror $9f_1$ at an angle of 60°. Namely, the infrared rays are irradiated forward and obliquely upward at an angle of 30° with the horizontal direction.

In the case of FIG. 20B where the microphone 1 is tilted by 45°, the mirror $9f_1$ is inclined downward at 7.5° with the horizontal direction as described, so that the infrared rays outputted from the LEDs 4b are incident upon and reflected by the mirror $9f_1$ at an angle of 37.5° and are thereby irradiated upward obliquely at an angle of 30° with the horizontal direction.

In another case of FIG. 20C where the microphone 1 is tilted by 90°, the mirror $9f_1$ is inclined upward at 15° with the horizontal direction, so that the infrared rays outputted from the LEDs 4b are incident upon and reflected by the mirror $9f_1$ at an angle of 15° to be consequently irradiated upward obliquely at an angle of 30° with the horizontal direction.

Thus, if the microphone 1 is held at any angle in the direction K1 or K2, the infrared output emitted from the LEDs 4b is irradiated always forward and obliquely upward at 30° by the mirror unit 9.

Since the direction of the infrared output is fixed in this manner, it becomes possible to considerably limit the number of receiving apparatus 30 to be installed and the area thereof. According to the contrivance mentioned, a wide directivity is not needed for the infrared output to consequently reduce the number of LEDs and the required driving current in the microphone 1, thereby realizing a high-performance cordless microphone system at lower cost.

Although the irradiation direction of the infrared output in the above embodiment is defined to be forward from the microphone 1 with an upward 30° inclination, the direction may be freely adjustable as desired by changing the angle of forming the mirror $9f_1$ on the top surface of the reflector 9f. For example, if the top surface of the reflector 9f is formed with a 45° inclination to serve as the mirror $9f_1$, the irradiation direction of the infrared output is always maintained forward from the microphone 1 with an upward 45° inclination.

If the microphone 1 is of a type to be used with a microphone stand fixedly and is never rotated in the direction K1 during the use, the effect mentioned above is achievable by providing merely a mechanism which is rotated by ½ angle in accordance with the rotation in the direction K2.

The microphone 1 of the embodiment is equipped with the gyro mirror unit of FIG. 11 or the mirror unit of FIG. 17, and the infrared output emitted from the LEDs 4b is reflected by such mirror unit so as to be irradiated to the outside of the microphone 1 in a predetermined angular range or in a predetermined direction. In practical use, however, there occurs an occasion where the directivity itself of the infrared output needs to be changed. For the purpose of meeting such requirement, a modification may be so contrived as to prepare a variety of mirror units with mirrors having concave, convex and planar surfaces respectively, wherein any suitable one of such mirror units is selectively usable by replacement in accordance with an individual condition.

Figure 21A:
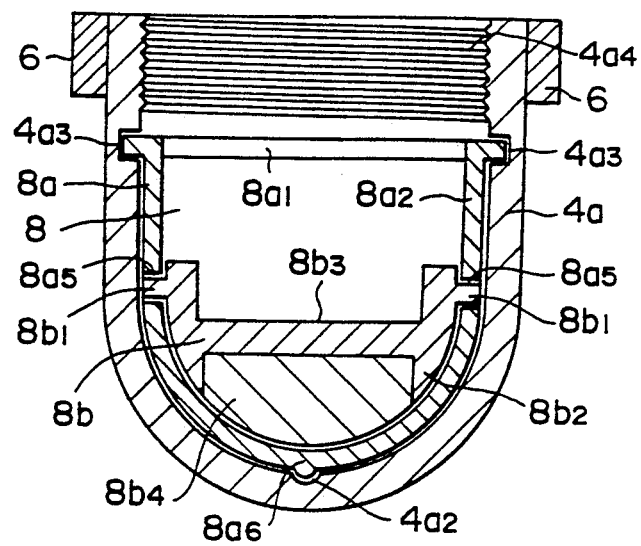
FIGS. 21A to 21C are sectional views of detachable infrared-ray transmitters employed in the microphone of the invention.
Figure 21B:
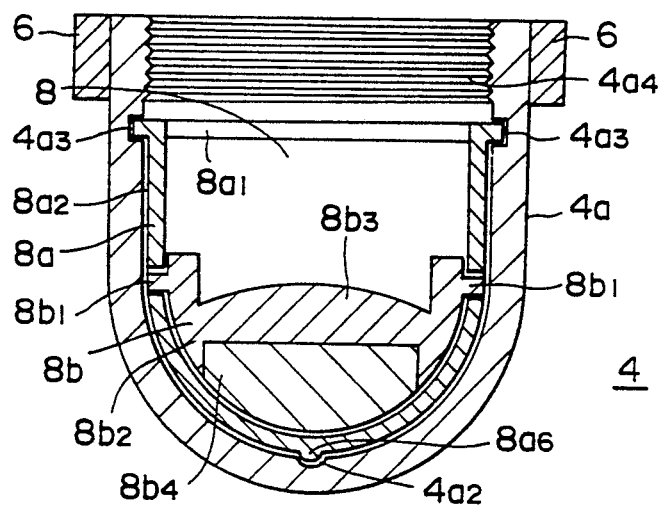
Figure 21C:
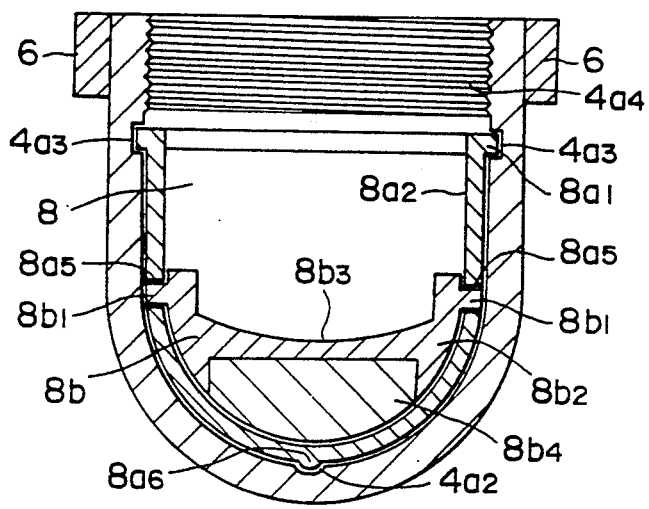

For example, as shown in each of FIGS. 21A to 21C, a gyro mirror unit 8 similar in operation to the example of FIG. 11 is provided in a cover 4a for an infrared-ray transmitter 4. A circular groove $4a_3$ is formed along the inner surface of the cover 4a, and a ring portion $8a_1$ of a support ring 8a is fitted into the groove $4a_3$ in a manner to be held rotatably therein. Thus, the gyro mirror unit 8 is supported merely by the cover 4a alone while being retained unseparably therefrom. And an engaging groove $4a_4$ is formed along the inner surface of an upper portion of the cover 4a.

In addition, a rubber ring 6 is attached to the peripheral surface of the upper portion of the cover 4a.

In the gyro mirror unit 8 of FIG. 21A, the mirror $8b_3$ is shaped to be planar on the top surface of the horizontal member 8b. Meanwhile the mirror $8b_3$ in another example of FIG. 21B is shaped to be convex, whereas the mirror $8b_3$ in a further example of FIG. 21C is shaped to be concave.

Figure 22:
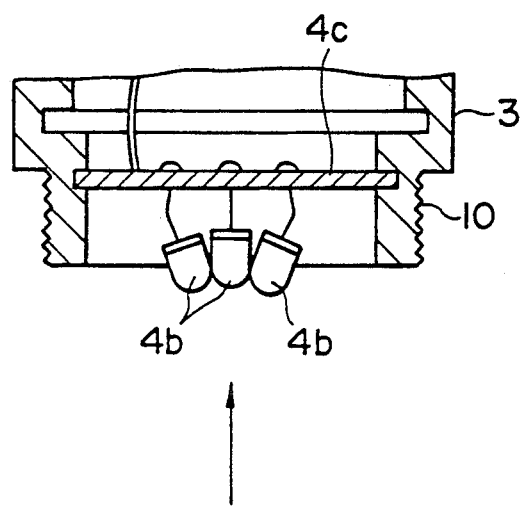
FIG. 22 is a sectional view of a lower end portion of the microphone body where the infrared-ray transmitter is detachably provided in the microphone of the embodiment.
Figure 23:
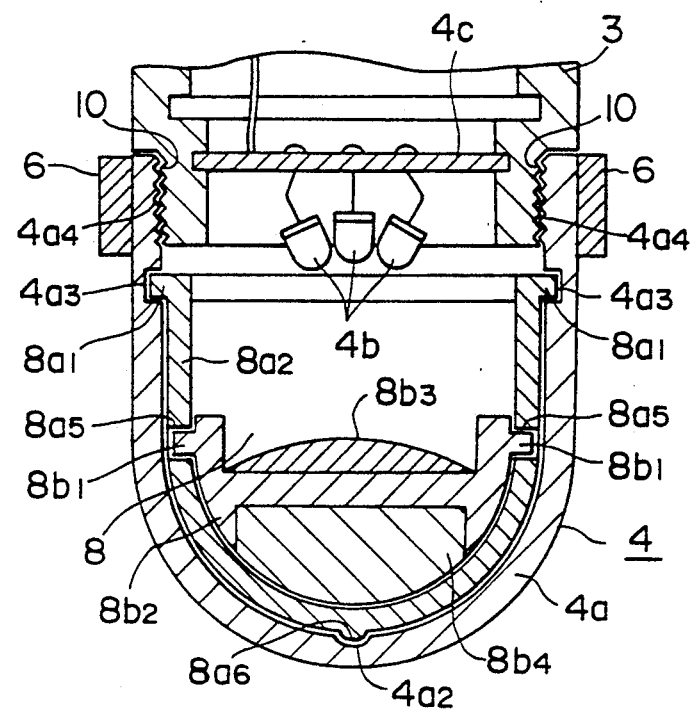
FIG. 23 is a sectional view of the lower end portion of the microphone body furnished with the detachable infrared-ray transmitter in the microphone of the embodiment.

A substrate 4c with LEDs 4b attached thereto is secured fixedly at the lower end of the body 3 of the microphone 1 as shown in FIG. 22, and a groove 10 to be engaged with the groove $4a_4$ in the cover 4a of the infrared-ray transmitter 4 is formed along the peripheral surface of the lowermost portion. Any desired one is selectable out of the infrared-ray transmitters 4 shown in FIGS. 21A to 21C, and the selected transmitter 4 may be mounted with rotation while engaging the groove $4a_4$ with the corresponding groove 10. FIG. 23 illustrates an exemplary state where the infrared-ray transmitter 4 having the convex mirror $8b_3$ of FIG. 21B is selectively mounted.

Figure 24A:
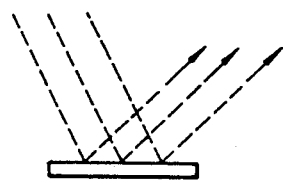
FIGS. 24A to 24C illustrate how infrared rays are reflected by specular surfaces of mirrors.
Figure 24B:
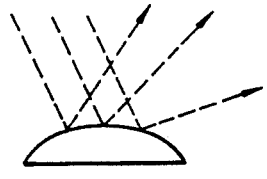
Figure 24C:
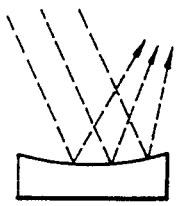

In comparison with the case of FIG. 24A where the mirror surface is planar, the infrared rays reflected by the convex mirror surface are diverged as illustrated in FIG. 24B so that a wide directivity can be obtained. Meanwhile, if the mirror surface is concave, the reflected rays are converged as illustrated in FIG. 24C to consequently obtain a narrow directivity.

Since the infrared-ray transmitters 4 having the mirrors $8b_3$ with mutually different surface shapes are selectively replaceable, the directivity of the infrared signal outputted from the microphone 1 can be controlled as desired by the user, hence constituting an optimal microphone system in conformity with the individual condition in practical use.

Due to adoption of the method that selectively changes the mirror surface shape, there is attainable an advantage of realizing a directivity-controllable microphone at lower production cost in comparison with another case where a plurality of infrared-ray transmitters with LEDs of different directivities are prepared for selective replacement. In this case, both the design and the manufacture are facilitated since no electrical connection is required between the microphone body 3 and the infrared-ray transmitter 4.

Furthermore, a plurality of replaceable infrared-ray transmitters 4 may be prepared, and the mirror unit of FIG. 17 may be employed in any of such transmitters 4.

As for the method of attaching to the microphone body 3 the infrared-ray transmitter 4 with mirrors having mutually different surface shapes, a variety of other means may be contrived inclusive of using screws, or providing a locking member in the infrared-ray transmitter 4 while providing a lockable portion on the microphone body 3 and engaging them with each other.

In addition to the above example where the entirety of the infrared-ray transmitter 4 is replaced, the structure may be so modified that the infrared-ray transmitter 4 is once removed and then the mirror alone is replaced with the other having a different surface shape.

Any of the above-described gyro mirror units 8 or mirror units 9 is applicable also in the receiving apparatus 30 to thereby realize proper setting of the light receiving direction within a predetermined range. And a cover (light receiver housing) having a mirror of a selected surface shape is replaceable also in the receiving apparatus 30, whereby the light concentration capability of the apparatus 30 is rendered controllable to a desired characteristic.

Figure 25:
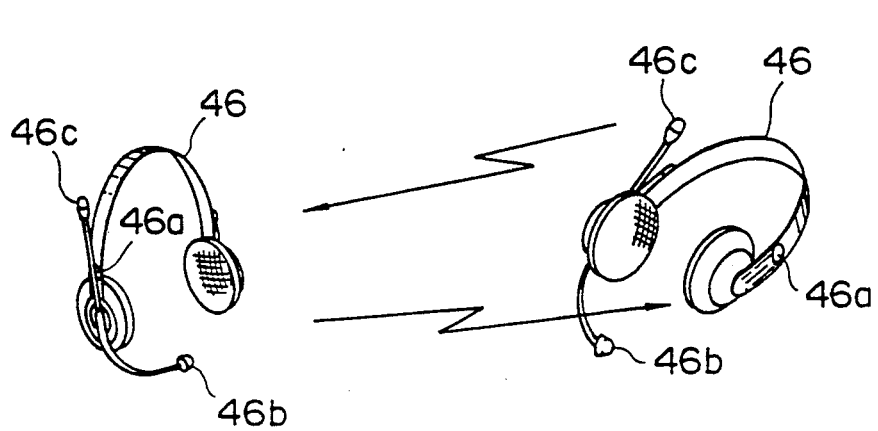
FIG. 25 shows the constitution of another embodiment representing the microphone and the microphone system of the present invention.

The microphone adapted for use in the microphone system of the present invention is not limited merely to the hand type mentioned above, and there may be contrived an example of FIG. 25 wherein a microphone 46b is provided in a headset 46 equipped with an infrared-ray receiver 46a and a demodulator, and a modulator such as the aforementioned one shown in FIG. 3 is incorporated therein so that an infrared signal can be outputted from an infrared-ray transmitter 46c. In this example, if two or more headsets 46 are prepared, conversation is possible by cordless communication between users furnished with such headsets.

According to the present invention which utilizes infrared rays in a cordless microphone system as described hereinabove, it becomes possible to realize both transmitting and receiving means at lower production cost with an advantage of strictly maintaining secrecy.

As for the microphone of the present invention where an infrared-ray transmitter comprising LEDs and so forth is disposed at the lower end of the microphone body, it is possible to avoid the problem that the infrared-ray transmitter is accidentally covered with the user's hand and, since the infrared-ray emitter is positioned farthest from the user's body during the operation, interception of the emitted infrared rays by the user can be avoided to consequently ensure the most efficient transmission of the infrared output.

What is claimed is:

1. An infrared-ray cordless microphone comprising:
    a microphone body having an upper end and a lower end;
    modulator means mounted inside the body of said microphone for modulating an acoustic-to-electric converted sound signal through a predetermined process;
    infrared-ray transmitter means for transmitting an output infrared signal obtained by converting the modulated sound signal from said modulator means; and
    said infrared-ray transmitter means includes an infrared-ray emitter for emitting said infrared signal and an infrared-ray permeable cover arranged at the lower end of the body through which the infrared signal passes;
    wherein said infrared-ray transmitter means is disposed at said lower end of the body of said microphone.

2. The microphone according to claim 1 wherein said infrared-ray transmitter means further comprises a reflector having a mirror to reflect the infrared signal through the permeable cover.

3. The microphone according to claim 2 wherein said reflector is detachable from the microphone body.

4. The microphone according to claim 2 wherein said mirror is supported rotatably with respect to both the center axis of said microphone body and another axis perpendicular to said center axis.

5. The microphone according to claim 4 wherein the mirror has a reflecting surface and a back portion behind said reflection surface, further comprising a weight disposed in said back portion of said mirror so that the reflecting surface thereof is always maintained at a predetermined angle.

6. The microphone according to claim 2 further comprising means defining a hermetic space, wherein said mirror is positioned to float on a liquid sealed up in said hermetic space.

7. The microphone according to claim 2 further comprising means defining a hermetic space, wherein said mirror comprises a liquid metal sealed up in said hermetic space.

8. The microphone according to any one of claims 1, 5, 6 and 7 wherein said infrared-ray emitter has a plurality of light emitting elements so disposed that the respective light emission directions are mutually different.

9. The microphone according to claim 2 wherein said infrared-ray transmitter means comprises a first rotary means rotatable with respect to the center axis of said microphone body; and a second rotary means pivotally supported by said first rotary means and, when said microphone body is rotated in a direction orthogonal to said center axis, said mirror is rotated by a preset angle in conformity with the rotation angle of said microphone body.

10. The microphone according to claim 9 wherein said second rotary means comprises a plurality of interlocked gears, and the angle of rotation of said mirror is determined by the numbers of teeth of said gears.

11. The microphone according to claim 9 wherein the angle of rotation of said second rotary means is so preset as to rotate said mirror by half the angle of rotation of said microphone body.

12. The microphone according to claim 1 wherein a projecting member is provided in the vicinity of said infrared-ray transmitter means and, when said microphone body is placed on a substantially horizontal plane, the surface of said infrared-ray transmitter means is kept away from contact with said horizontal plane.

13. The microphone according to claim 12 wherein said projecting member comprises a rubber ring mounted between said microphone body and said infrared-ray transmitter means.

14. The microphone according to claim 13 wherein said rubber ring has a polygonal shape.

15. An infrared-ray cordless microphone system comprising:
a microphone formed with a body having an upper end and a lower end;
modulator means housed in said body for modulating an acoustic-to-electric converted sound signal through a predetermined process;
infrared-ray transmitter means for transmitting an output infrared signal obtained by converting the modulated sound signal from said modulator means;
said infrared-ray transmitter means includes an infrared-ray emitter for emitting said infrared signal and an infrared-ray permeable cover arranged at the lower end of the body through which the infrared signal passes;
a sound output means having infrared-ray receiver means for receiving the infrared signal from said microphone;
demodulator means for demodulating the received infrared signal; and
electric-to-acoustic converter means for converting the demodulated signal into a sound signal.

16. The microphone according to claim 15 wherein said sound output means comprises at least one headphone.

17. The microphone according to claim 15 wherein said infrared-ray transmitter means is disposed at a lower end of said microphone body.

18. The microphone according to claim 15 wherein said infrared-ray transmitter means further comprises a reflector having a mirror to reflect the infrared signal through the permeable cover.

* * * * *